(12) United States Patent
Shim et al.

(10) Patent No.: US 12,000,978 B2
(45) Date of Patent: Jun. 4, 2024

(54) METHOD FOR MANUFACTURING WINDOW AND METHOD FOR MANUFACTURING DISPLAY DEVICE

(71) Applicant: SAMSUNG DISPLAY CO., LTD., Yongin-si (KR)

(72) Inventors: Byoungyul Shim, Hwaseong-si (KR); Seungyo Yang, Suwon-si (KR); Jaeseung Jeon, Cheonan-si (KR); Hyun Chul Jung, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 959 days.

(21) Appl. No.: 16/822,169

(22) Filed: Mar. 18, 2020

(65) Prior Publication Data
US 2020/0348452 A1    Nov. 5, 2020

(30) Foreign Application Priority Data
May 3, 2019    (KR) .................... 10-2019-0052456

(51) Int. Cl.
*G02B 1/12*    (2006.01)
*B23K 26/00*    (2014.01)
(Continued)

(52) U.S. Cl.
CPC ............... *G02B 1/12* (2013.01); *B23K 26/364* (2015.10); *B23K 26/57* (2015.10); *G02B 1/14* (2015.01);
(Continued)

(58) Field of Classification Search
CPC .................. B23K 26/57; B23K 26/36
See application file for complete search history.

(56) References Cited

U.S. PATENT DOCUMENTS

2006/0091126 A1*  5/2006  Baird .................... B23K 26/40
                                                        219/121.72
2006/0126868 A1*  6/2006  Umetsu ............. B23K 26/0613
                                                        381/173
(Continued)

FOREIGN PATENT DOCUMENTS

CN    107459266 A  * 12/2017  ........... B23K 26/361
CN    108401049       8/2018
(Continued)

OTHER PUBLICATIONS

Translation of DE-102011051198-A1 (Year: 2012).*
Translation of WO-2013100067-A1 (Year: 2013).*
Translation of CN-107459266-A (Year: 2017).*

*Primary Examiner* — Elizabeth M Kerr
(74) *Attorney, Agent, or Firm* — F. CHAU & ASSOCIATES, LLC (57) ABSTRACT

Systems and methods are provided for manufacturing a window from a transparent member. Forming the window may include forming of a groove by irradiating first laser light and removing a portion of a transparent member by irradiating second laser light focused at a depth of the groove. The first laser light may be emitted from a first laser generator and may be irradiated along an edge of a first area defined in a second surface of the transparent member. A second laser light may be focused to the depth of the groove, and thus a portion of the transparent member may be cut. The second laser light may be emitted by a second laser generator, and a focus of the second laser light may be located within the transparent member.

20 Claims, 8 Drawing Sheets

(51) Int. Cl.
   *B23K 26/073*   (2006.01)
   *B23K 26/364*   (2014.01)
   *B23K 26/57*    (2014.01)
   *C03C 23/00*    (2006.01)
   *G02B 1/14*     (2015.01)
   *G06F 1/16*     (2006.01)

(52) U.S. Cl.
   CPC .......... *G06F 1/1609* (2013.01); *G06F 1/1626* (2013.01); *B23K 26/00* (2013.01); *B23K 26/073* (2013.01); *C03C 23/0025* (2013.01)

(56) References Cited

U.S. PATENT DOCUMENTS

| | | | |
|---|---|---|---|
| 2006/0148210 A1* | 7/2006 | Furuta | B23K 26/0608 438/460 |
| 2008/0231940 A1* | 9/2008 | Imanishi | G03F 7/70416 359/305 |
| 2008/0308884 A1 | 12/2008 | Kalvesten | |
| 2010/0243623 A1* | 9/2010 | Lee | B23K 26/40 219/121.69 |
| 2011/0266264 A1* | 11/2011 | Rumsby | B23K 26/06 219/121.72 |
| 2014/0175067 A1* | 6/2014 | Reichenbach | B23K 26/361 219/121.61 |
| 2015/0274583 A1 | 10/2015 | An et al. | |
| 2016/0275830 A1* | 9/2016 | You | G02F 1/133305 |
| 2017/0215294 A1* | 7/2017 | Jones | H05K 5/0243 |
| 2018/0059454 A1 | 3/2018 | Shin et al. | |
| 2018/0111869 A1* | 4/2018 | O'Connor | B23K 26/0624 |
| 2018/0151644 A1 | 5/2018 | Han et al. | |
| 2019/0030648 A1* | 1/2019 | Priewasser | H01L 21/3065 |
| 2019/0255649 A1* | 8/2019 | Kurosaki | B23K 26/0622 |
| 2020/0209925 A1* | 7/2020 | Paek | G06F 1/1652 |
| 2020/0306889 A1* | 10/2020 | Goya | B23K 26/082 |

FOREIGN PATENT DOCUMENTS

| | | | | |
|---|---|---|---|---|
| CN | 108941919 | | 12/2018 | |
| DE | 102011051198 A1 | * | 12/2012 | ......... B23K 2203/50 |
| KR | 10-1373142 | | 3/2014 | |
| KR | 10-2015-0114059 | | 10/2015 | |
| KR | 10-2018-0025383 | | 3/2018 | |
| WO | WO-2013100067 A1 | * | 7/2013 | .......... G06F 1/1626 |
| WO | 2019064325 | | 4/2019 | |

\* cited by examiner

METHOD FOR MANUFACTURING WINDOW AND METHOD FOR MANUFACTURING DISPLAY DEVICE

CROSS-REFERENCE TO RELATED APPLICATION

This U.S. non-provisional patent application claims priority under 35 U.S.C. § 119 of Korean Patent Application No. 10-2019-0052456, filed on May 3, 2019, the entire contents of which are hereby incorporated by reference.

BACKGROUND

Many mobile electronic devices, such as tablet computers and mobile phones, include a display device for displaying images. The display device may include a display panel and a window covering the display panel to protect the display panel from damage.

Display devices with curved edges allow for an image to be displayed on a side surface, oblique to a normal display viewing angle. The process for manufacturing a display device with curved edges requires additional steps to create a curved surface.

A significant portion of the time and cost of a manufacturing process time for a display device may be used in the creation of the curved edges. Therefore, there is an opportunity to improve the manufacturing time and process efficiency of a display device with curved edges.

SUMMARY

The present disclosure provides a method for manufacturing a window, which is capable of reducing a processing time to improve process efficiency, and a method for manufacturing a display device.

The present disclosure also provides a method for manufacturing a window including four side edges having substantially the same height and a method for manufacturing a display device.

In an embodiment of the inventive concept, a method for manufacturing a window may include forming a groove by irradiating first laser light to an edge of a first area defined on a bottom surface of a transparent member, and removing a portion of the transparent member by irradiating second laser light, which is different from the first laser light and has a focus adjusted at a depth of the groove of the transparent member, to the first area, thereby forming a cover window.

In an embodiment, the first laser light may have an infrared wavelength. In an embodiment, the second laser light may have an ultraviolet wavelength. In an embodiment, the method may further include processing a top surface of the transparent member.

In an embodiment, the processing of the top surface of the transparent member may include a computer numerical control (CNC) process. In an embodiment, the processing of the top surface of the transparent member may be performed before the forming of the groove by irradiating the first laser light.

In an embodiment, the processing of the top surface of the transparent member may include a polishing process. In an embodiment, the first laser light may be emitted by a laser generator, and the laser generator may have a constant moving speed and may irradiate the first laser light with a constant intensity to the edge of the first area of the transparent member.

In an embodiment, the first area may have a square shape or a rectangular shape when viewed in a plan view. In an embodiment, a spot size of the first laser light may be different from a spot size of the second laser light.

In an embodiment, a spot size of the first laser light may range from 20 μm to 30 μm. In an embodiment, a spot size of the second laser light may range from 5 μm to 15 μm. In an embodiment, the depth of the groove formed by the first laser light may range from 0.3 mm to 0.7 mm.

In an embodiment, the portion of the transparent member removed by irradiating the second laser light may be defined by a plane which passes along an inner surface of the groove by the depth of the groove and is parallel to one surface of the transparent member.

In an embodiment, the method may further include processing an inner surface of the cover window, and processing an outer surface of the cover window. In an embodiment, the processing of the inner surface of the cover window and the processing of the outer surface of the cover window may be performed by computer numerical control (CNC) processes.

In an embodiment, each of the processing of the inner surface of the cover window and the processing of the outer surface of the cover window may include a polishing process. In an embodiment, the inner surface of the cover window may include a bottom surface, and an inner side surface extending from the bottom surface. The outer surface of the cover window may include a top surface, and an outer side surface extending from the top surface. An angle between the bottom surface and the inner side surface of the cover window may be about 90 degrees. In an embodiment, a height of the inner side surface of the cover window may be constant.

In an embodiment of the inventive concepts, a method for manufacturing a display device may include preparing a display panel, forming a groove by irradiating first laser light to an edge of a first area defined on a bottom surface of a transparent member, removing a portion of the transparent member by irradiating second laser light, which is different from the first laser light and has a focus adjusted at a depth of the groove of the transparent member, to the first area, thereby forming a cover window, and bonding the display panel and the cover window to each other.

BRIEF DESCRIPTION OF THE DRAWINGS

The present disclosure herein relates generally to a method for manufacturing a window, and more particularly, to a method for manufacturing a window with curved edges, which is capable of reducing process time, and a method for manufacturing a display device.

The accompanying drawings are included to provide a further understanding of the inventive concepts and are incorporated in and constitute a part of this specification. The drawings illustrate exemplary embodiments of the inventive concepts and, together with the description, serve to explain principles of the inventive concepts. In the drawings.

DETAILED DESCRIPTION

The inventive concepts now will be described more fully hereinafter with reference to the accompanying drawings, in which various embodiments are shown. The inventive concepts may, however, be embodied in many different forms and should not be construed as limited to the embodiments set forth herein. Rather, these embodiments are provided so that this disclosure will be thorough and complete, and will fully convey the scopes of the inventive concepts to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the context clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer or section discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle has have rounded or curved features. Thus, the regions illustrated in the figures are schematic in nature, and their shapes are not intended to illustrate the actual shape of a region of a device and are not intended to limit the scope of exemplary embodiments.

Hereinafter, exemplary embodiments of the inventive concepts will be described in detail with reference to the accompanying drawings.

Figure 1:
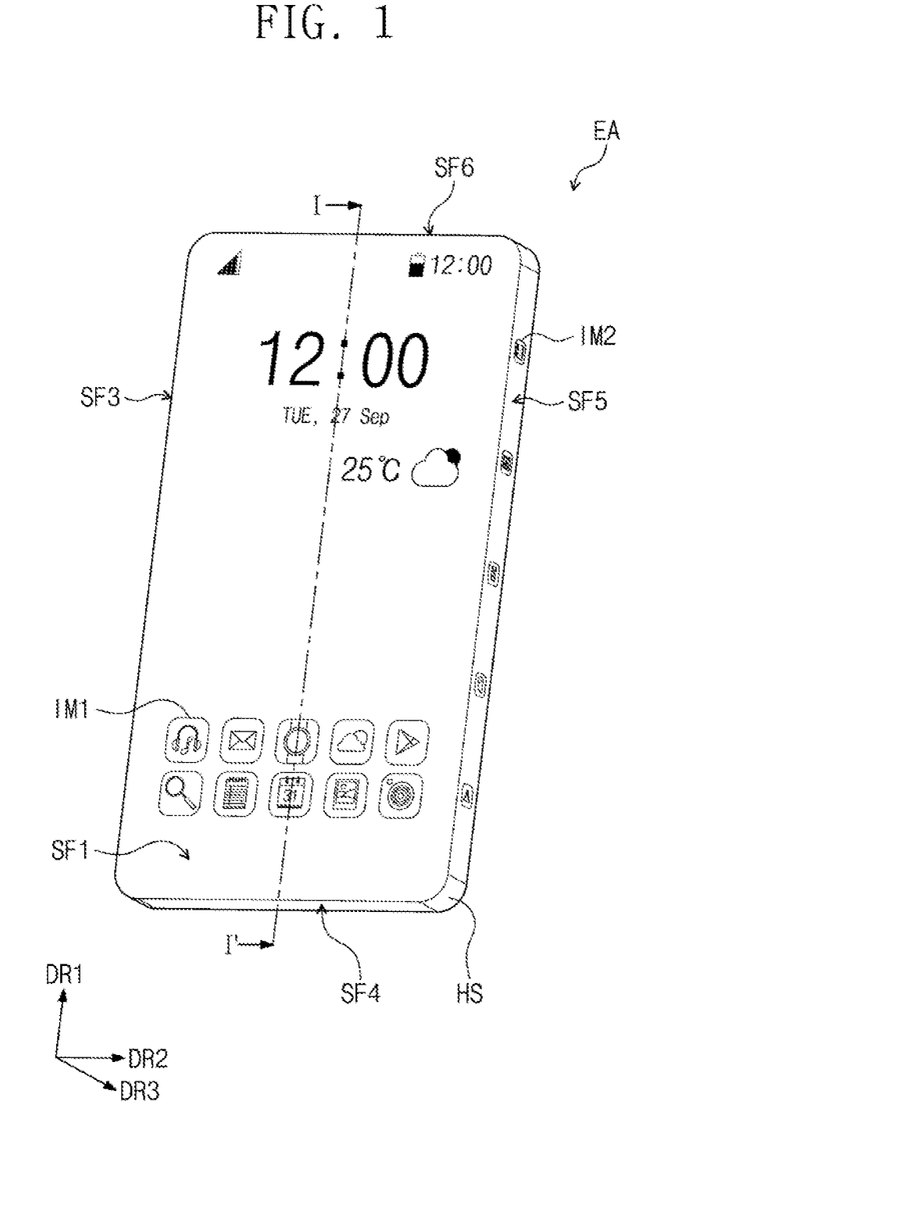
FIG. 1 is a perspective view illustrating a front surface and some side surfaces of a display device according to an embodiment of the inventive concepts.

FIG. 1 is a perspective view illustrating a front surface and some side surfaces of a display device according to an embodiment of the inventive concepts.

A display device EA may display images IM1 and IM2 on a front surface SF1 and at least one of the first to fourth side surfaces SF3, SF4, SF5 and SF6 connected to the front surface SF1 by electrical signals and may sense an external input. The present embodiment illustrates an image IM1 displayed on the front surface SF1 of the display device EA and an image IM2 displayed on the third side surface SF5 of the display device EA.

The external input may include at least one of various external inputs such as a part (e.g., a finger) of a user's body, light, heat, and pressure. In addition, the external input may include a contact touch or a proximity touch. In the present embodiment, a smartphone is illustrated as an example of the display device EA. However, embodiments of the inventive concepts are not limited thereto. In certain embodiments, the display device EA may be applied to other various products, including display devices, such as a television, a monitor, a tablet, a game console, and a smartwatch. In addition, the external input may include force (or pressure) or a touch.

The front surface SF1 of the display device EA may be parallel to a plane defined by a first direction DR1 and a second direction DR2. In an embodiment of the inventive concepts, the display device EA may have a long side extending in the first direction DR1 and a short side extending in the second direction DR2 when viewed in a plan view. A normal direction of the front surface SF1 of the display device EA (i.e., a thickness direction of the display device EA) may be defined as a third direction DR3. However, the first to third directions DR1, DR2, and DR3 may be relative concepts and may be changed into other directions.

Figure 2:
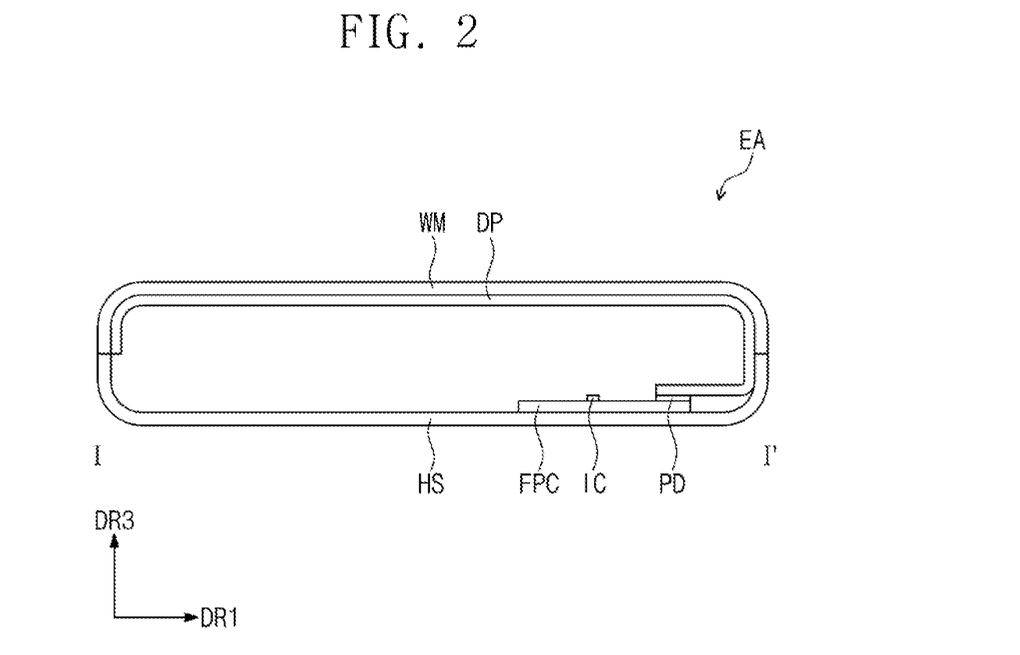
FIG. 2 is a cross-sectional view taken along a line I-I' of FIG. 1.

FIG. 2 is a cross-sectional view taken along a line I-I' of FIG. 1.

The display device EA may include a display panel DP, a window member WM, a printed circuit board FPC, and a housing HS. The display panel DP may display an image and may be flexible. In the present embodiment, the display panel DP may be an organic light-emitting display panel.

The display panel DP may be bent to overlap with the front surface SF1, and the first to fourth side surfaces SF3, SF4, SF5, and SF6 of the display device EA and may display images through the front surface SF1 and at least one of the first to fourth side surfaces SF3, SF4, SF5, and SF6.

The printed circuit board FPC may adhere to the display panel DP. The printed circuit board FPC may provide external signals to the display panel DP and may transmit signals received from the display panel DP to the outside. The printed circuit board FPC may include a driving circuit chip IC. However, embodiments of the inventive concepts are not limited thereto. In another embodiment, the driving circuit chip IC may be mounted on the display panel DP.

The window member WM may be disposed on the display panel DP. The window member WM may cover the display panel DP and may have a shape similar to that of the display panel DP. The window member WM may form the front surface SF1, and at least a portion of the first to fourth side surfaces SF3, SF4, SF5, and SF6 of the display device EA.

The housing HS and the window member WM may form the exterior of the display device EA. In the present embodiment, the housing HS forms a back surface of the display device EA and regions between the first to fourth side surfaces SF3, SF4, SF5, and SF6 of the display device EA. However, embodiments of the inventive concepts are not limited thereto. In another embodiment, when the display panel DP and the window member WM cover the whole of the exterior of the display device EA, the housing HS may be omitted.

Figure 3:
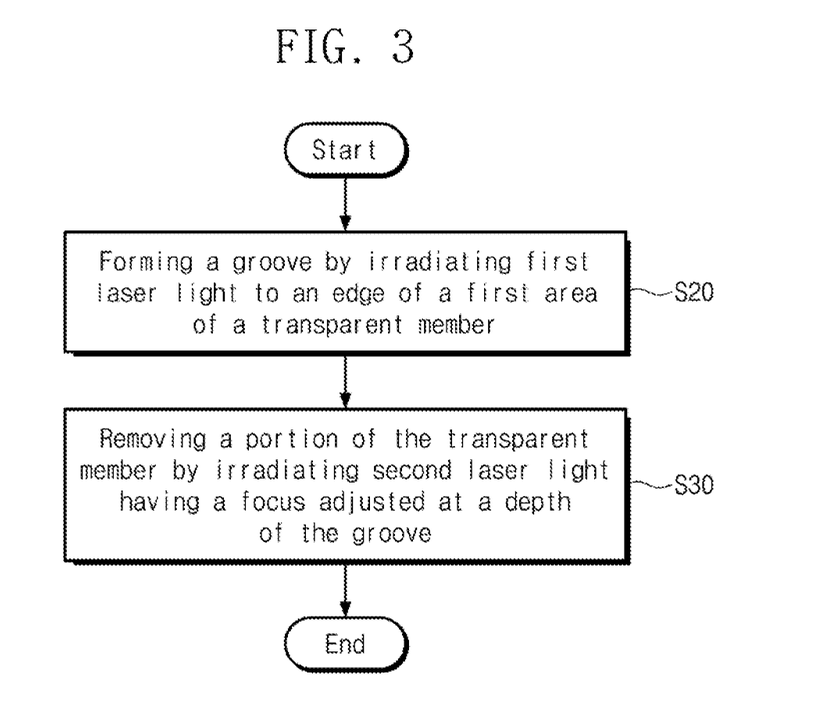
FIG. 3 is a flowchart illustrating a method for manufacturing a window, according to an embodiment of the inventive concepts.
Figure 4:
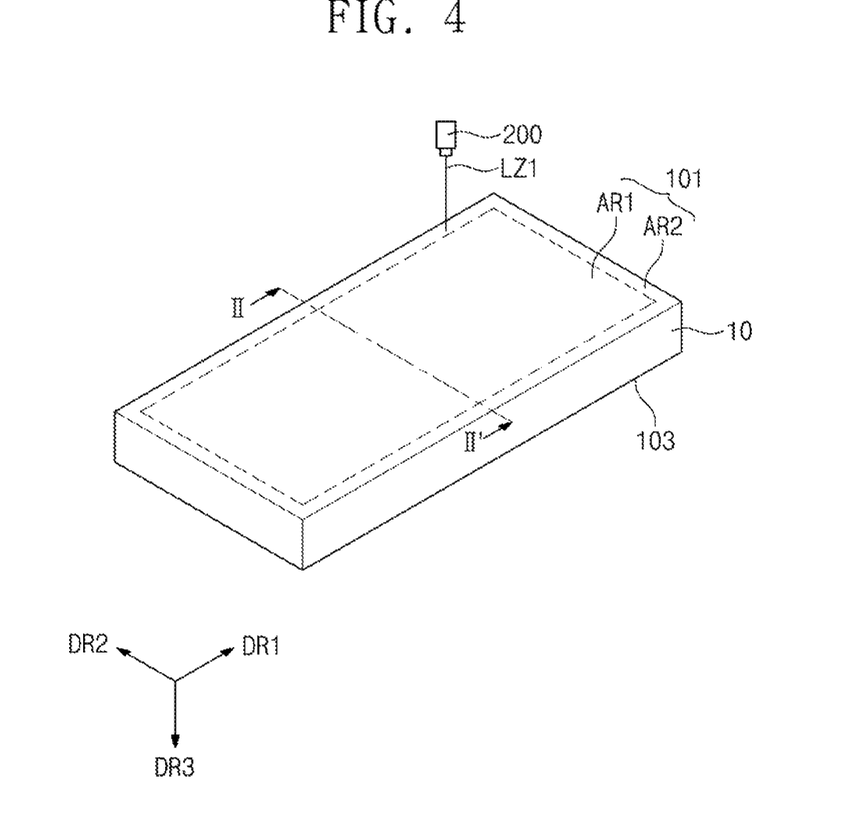
FIG. 4 is a perspective view illustrating a transparent member according to an embodiment of the inventive concepts.

FIG. 3 is a flowchart illustrating a method for manufacturing a window, according to an embodiment of the inventive concepts, and FIG. 4 is a perspective view illustrating a transparent member according to an embodiment of the inventive concepts.

Referring to FIG. 3, a method for manufacturing a window according to an embodiment may include forming a groove and removing a portion of the transparent member. Forming a groove may be performed by irradiating a first laser light to an edge of a first area of a transparent member (S20). Removing a portion of the transparent member may be performed by irradiating a second laser light having a focus adjusted at a depth of the groove (S30).

In various embodiments, the groove may be formed using a technique other than irradiating a laser. For example, the groove may be formed by grinding, cutting, or melting the transparent member. In some cases, the transparent member is not transparent to every wavelength of light, but the transparent member is at least partially transparent to light having a wavelength of the second laser light. This allows the second laser light to pass through at least a portion of the transparent member such that it only removes material of the transparent member at the desired depth (i.e., the depth of the groove).

According to embodiments of the invention, systems and methods enable forming a groove in a solid object (e.g., a transparent member), wherein the groove extends in a first direction to a depth less than a thickness of the solid object; irradiating the solid object with a laser (e.g., the second laser) to form an internal cut in the solid object; wherein the solid object is at least partially transparent to a wavelength of the laser and the laser converges to a focus point at the depth of the groove; and removing a portion of the solid object based on the groove and the cut to form the cavity in the solid object.

Referring to FIGS. 3 and 4, first, a transparent member 10 may be prepared. The transparent member 10 may include a first surface 103 and a second surface 101 opposite to the first surface 103. A first area AR1 and a second area AR2 may be defined in the second surface 101. The first area AR1 may be surrounded by the second area AR2. The first area AR1 may have a rectangular shape or a square shape when viewed in a plan view. However, embodiments of the inventive concepts are not limited thereto.

The transparent member 10 may be formed of a transparent material such as glass, as well as a transparent polymer material such as polyethylene terephthalate (PET) or poly methyl methacrylate (PMMA). However, embodiments of the inventive concepts are not limited thereto.

Figure 5A:
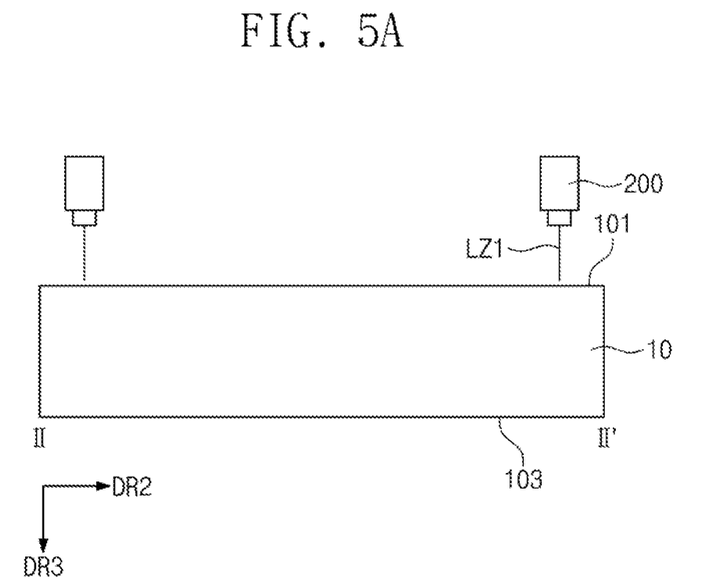
FIGS. 5A to 5C are cross-sectional views illustrating the method for manufacturing a window in FIG. 3.
Figure 5B:
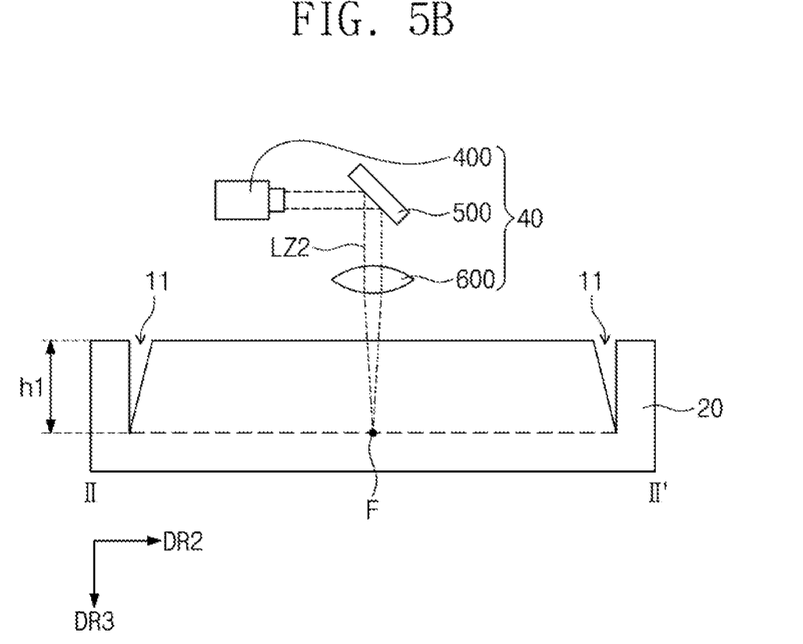
Figure 5C:
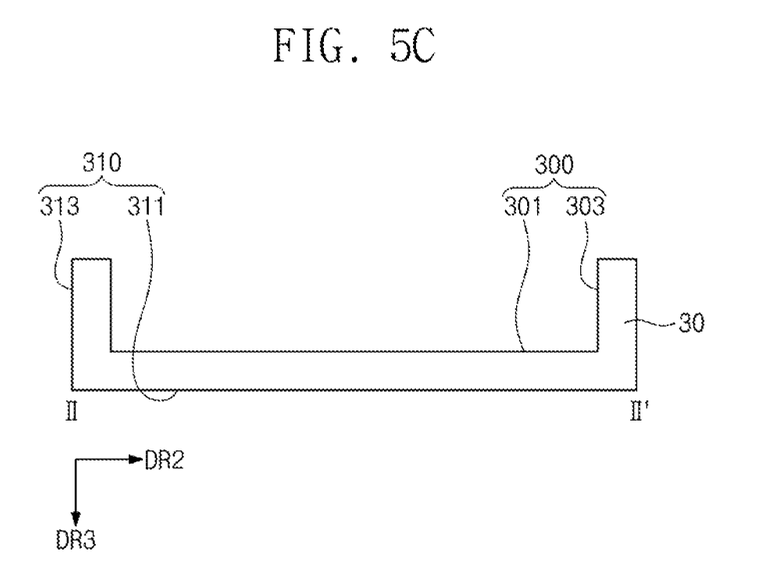

FIGS. 5A to 5C are cross-sectional views illustrating a method for manufacturing a window, according to an embodiment of the inventive concepts.

Referring to FIGS. 3 and 5A, in the step S20, a first laser generator 200 may emit the first laser light LZ1 in a direction from the second surface 101 toward the first surface 103 of the transparent member 10 (i.e., in the third direction DR3 corresponding to a direction perpendicular to the second surface 101 of the transparent member 10). As illustrated in FIG. 5B, groove 11, having a depth hl in the third direction DR3, may be formed from the second surface 101 of the transparent member 10.

The first laser light LZ1 may be irradiated along the edge of the first area AR1. The intensity of the first laser light LZ1 and a moving speed of the first laser generator 200 may be kept constant during the irradiation of the first laser light LZ1 along the edge of the first area AR1. Thus, the depth hl of the groove 11 may be constantly formed along the edge of the first area AR1.

According to an embodiment, the depth hl of the groove 11 formed by the first laser light LZ1 ranges from 0.3 mm to 0.7 mm. The first laser light LZ1 may have a wavelength in an infrared band. However, embodiments of the inventive concepts are not limited thereto. In certain embodiments, the first laser generator 200 may other various lasers such as a carbon dioxide laser, a semiconductor laser, or an excimer laser.

A nanosecond laser having a pulse irradiation time of about $10^{-9}$ seconds may be used as the first laser light LZ1. However, embodiments of the inventive concepts are not limited thereto. In certain embodiments, picosecond laser having a pulse irradiation time of about $10^{-12}$ seconds or femtosecond laser having a pulse irradiation time of about $10^{-15}$ seconds may be used as the first laser light LZ1.

When the femtosecond laser is used as the first laser light LZ1, an incident pulse time may be shorter than a time for which heat is transmitted to the transparent member 10. Thus, heat diffusion may be minimized in the cutting of the transparent member 10. As a result, it is possible to minimize the generation of a heat-affected zone (HAZ) in a portion of the transparent member 10, to which the first laser light LZ1 is irradiated. A spot size of the first laser light LZ1 may range from 20 μm to 30 μm.

Referring to FIGS. 3 and 5B, in step S30, the second laser light LZ2 may be irradiated in the direction from the second surface 101 toward the first surface 103 of the transparent member (i.e., in the third direction DR3 corresponding to the direction perpendicular to the second surface 101 of the transparent member).

Referring to FIG. 5B, a laser optical apparatus 40 may include a second laser generator 400, a mirror 500, a condensing lens 600, and a focus controller (not shown).

The second laser generator 400 may emit the second laser light LZ2 toward the mirror 500. The mirror 500 may receive the second laser light LZ2 emitted from the second laser generator 400. The mirror 500 may change the traveling direction of the second laser light LZ2 into the third direction DR3 corresponding to the direction perpendicular to the second surface 101 of the transparent member 20 in which the groove 11 is formed.

The condensing lens 600 may be disposed between the mirror 500 and the transparent member 20 having the groove 11. The condensing lens 600 may condense or collect the second laser light LZ2 reflected from the mirror 500 at a predetermined focus F. The focus F of the second laser light LZ2 transmitted through the condensing lens 600 may be located within the transparent member 20. The condensing lens 600 may be a lens for collecting the second laser light LZ2 reflected by the mirror 500.

The focus controller (not shown) may be disposed between the condensing lens 600 and the transparent member 20 having the groove 11. The second laser light LZ2 transmitted through the condensing lens 600 may be refracted in the focus controller (not shown), and thus an optical path length of the second laser light LZ2 may be increased.

The focus controller (not shown) may change the optical path length of the second laser light LZ2 to change the focus F of the second laser light LZ2. Thus, a depth of the focus F of the second laser light LZ2 transmitted through the condensing lens 600 may be adjusted in such a way that the depth of the focus F is equal to the depth hl of the groove 11.

A portion of the transparent member 20 having groove 11 may be removed by use of heat generated by the second laser light LZ2 The groove 11 corresponds to the focus F of the second laser light LZ2.

The laser optical apparatus 40 may move an irradiation position of the second laser light LZ2 in such a way that the second laser light LZ2 is provided to a plane parallel to one surface of the transparent member 20 having the groove 11. Alternatively, during the irradiation of the second laser light LZ2, the irradiation position of the second laser light LZ2 may be moved by moving a stage, on which the transparent member 20 is located, in the first direction DR1 or the second direction DR2.

The laser optical apparatus 40 may scan the first area AR1 while fixing a position of the focus F of the second laser light LZ2, thereby removing a portion of the transparent member 20. The portion of the transparent member 20 removed by the irradiation of the second laser light LZ2 may be defined by a plane that passes along an inner surface of the groove 11 by the depth hl of the groove 11 and is parallel to the one surface of the transparent member 20.

The second laser light LZ2 may pass through the transparent member 20 and may have a wavelength in an ultraviolet band. A spot size of the second laser light LZ2 may range from 5 μm to 15 μm. However, embodiments of the inventive concepts are not limited thereto. In certain embodiments, the second laser generator 400 may use other various lasers such as a carbon dioxide laser, a semiconductor laser, or an excimer laser.

Referring to FIG. 5C, a cover window 30, in which a portion of the transparent member 10 is removed, may be formed after the steps S20 and S30. Thereafter, the display panel DP and the cover window 30 may be bonded to each other to manufacture the display device EA.

In a method for manufacturing the cover window 30 using a process of physically shaving or polishing a surface of the transparent member 10, the whole of a portion to be removed in the transparent member 10 should be shaved or polished. In addition, when the portion to be removed has a predetermined thickness, a polishing process should be started from the surface of the transparent member 10, and thus a processing time may be increased.

However, in the method for manufacturing the window according to the embodiment of the inventive concepts, the portion of the transparent member 10 may be cut and removed using the first laser light LZ1 and the second laser light LZ2, and thus the processing time may be reduced as compared with the processing time of the physically shaving or polishing process. As a result, process efficiency may be improved.

Figure 6:
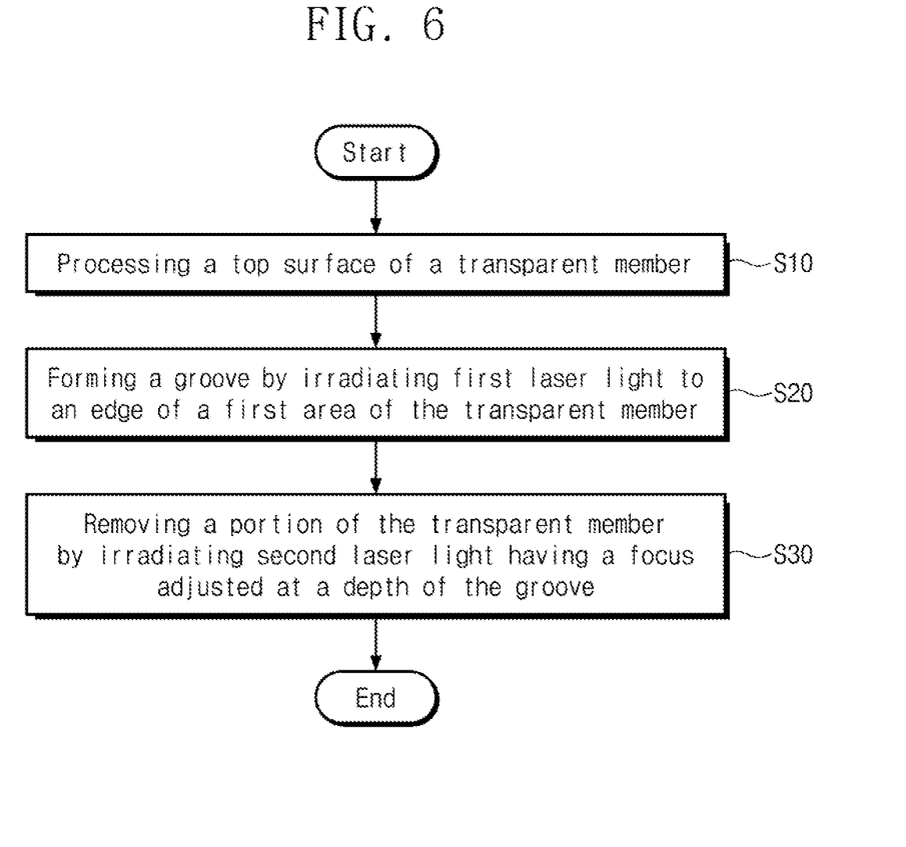
FIG. 6 is a flowchart illustrating a method for manufacturing a window, according to an embodiment of the inventive concepts.
Figure 7:
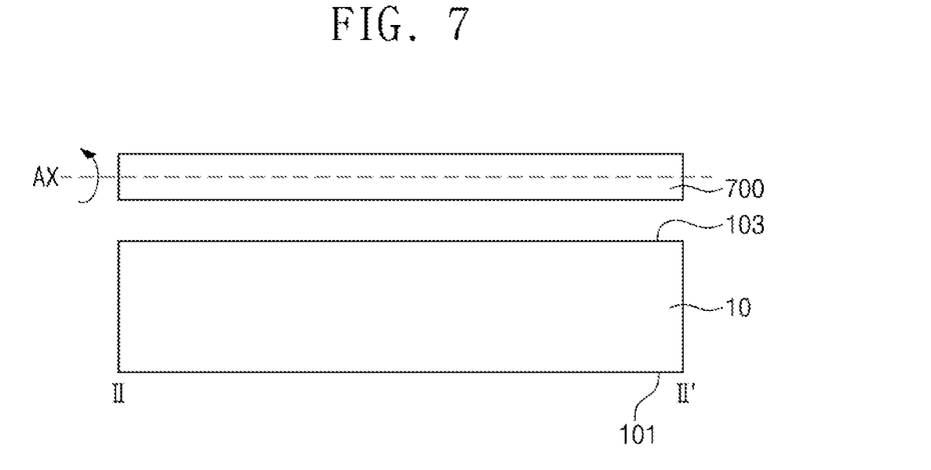
FIG. 7 is a cross-sectional view illustrating a step S10 in FIG. 6.

FIG. 6 is a flowchart illustrating a method for manufacturing a window, according to an embodiment of the inventive concepts, and FIG. 7 is a cross-sectional view illustrating a step S10 in FIG. 6.

In a method for manufacturing a window described with reference to FIGS. 6 and 7, steps S20 and S30 may be substantially the same as described with reference to FIGS. 1 to 5, and thus the detailed descriptions thereto will be omitted.

Referring to FIGS. 6 and 7, in an embodiment of the inventive concepts, a step S10 of processing the first surface 103 of the transparent member 10 may be performed before the step S20.

The step S10 may include a polishing process and may be performed by a computer numerical control (CNC) process. In the polishing process, the whole of the first surface 103 of the transparent member 10 may be polished using a polishing member 700. The whole of the first surface 103 of the transparent member 10 may be polished by a method of rotating the polishing member 700 about a perpendicular axis AX while moving the polishing member 700 in a direction substantially parallel to the first surface 103.

The first surface 103 of the transparent member 10 may be polished to reduce cracks, and thus mechanical strength of the cover window 30 may be improved. For example, the step S10 may include a polishing process for removing cracks or defects occurring at a surface (e.g., an outer surface 310) of the cover window 30.

Figure 8:
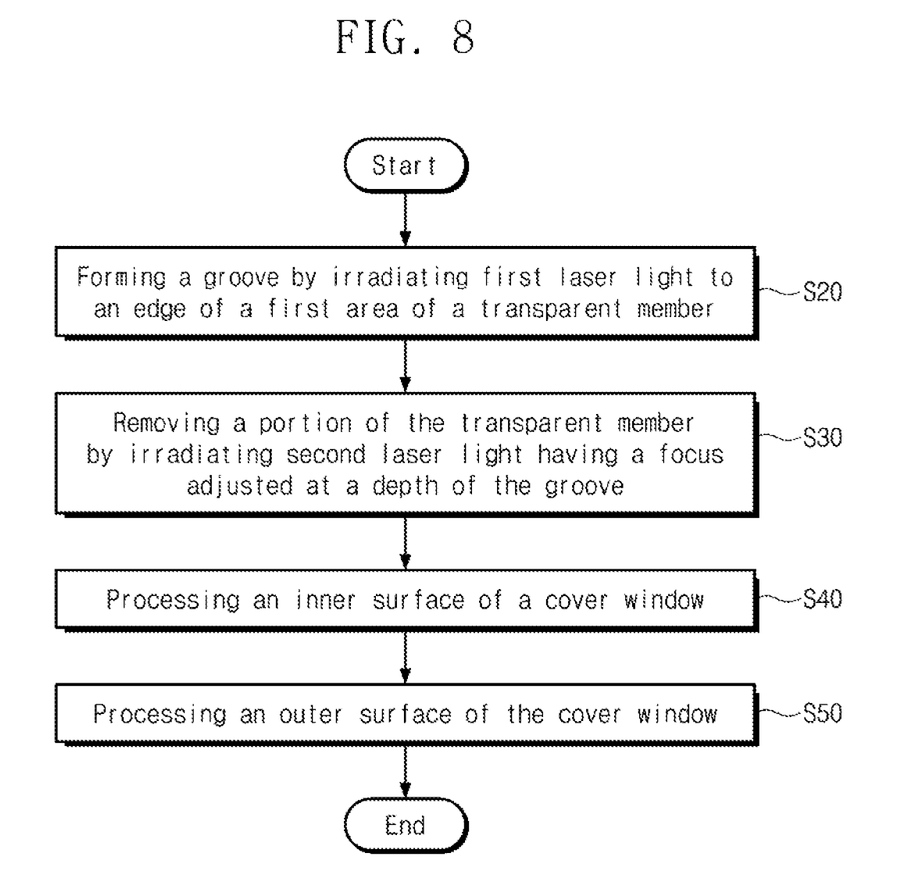
FIG. 8 is a flowchart illustrating a method for manufacturing a window, according to an embodiment of the inventive concepts.
Figure 9A:
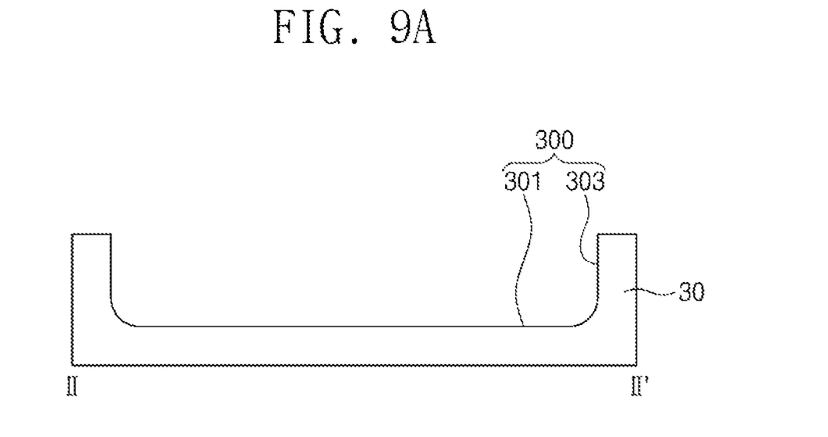
FIG. 9A is a cross-sectional view illustrating a step S40 in FIG. 8.
Figure 9B:
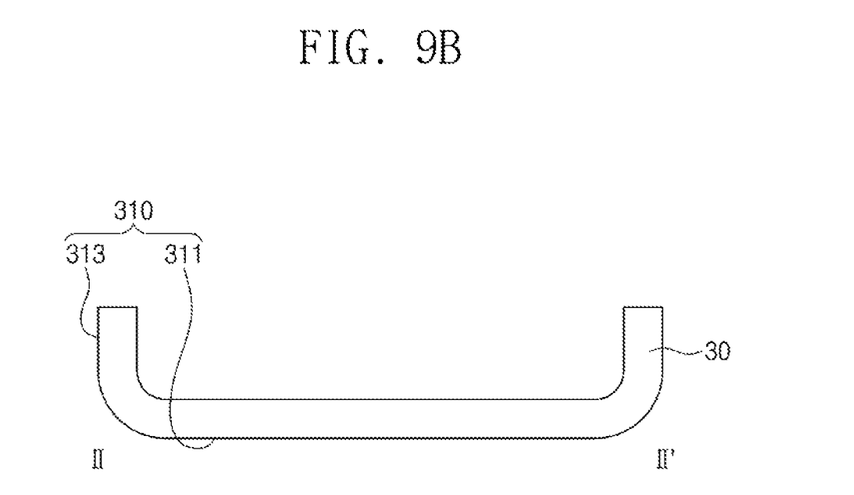
FIG. 9B is a cross-sectional view illustrating a step S50 in FIG. 8.

FIG. 8 is a flowchart illustrating a method for manufacturing a window, according to an embodiment of the inventive concepts. FIG. 9A is a cross-sectional view illustrating a step S40 in FIG. 8, and FIG. 9B is a cross-sectional view illustrating a step S50 in FIG. 8.

In a method for manufacturing a window described with reference to FIGS. 8, 9A, and 9B steps S20 and S30 may be substantially the same as described with reference to FIGS. 1 to 5, and thus the detailed descriptions thereto will be omitted.

Referring to FIG. 8, in an embodiment of the inventive concepts, a method for manufacturing a window may include processing an inner surface 300 of the cover window 30 (S40) and processing an outer surface 310 of the cover window 30 (S50), after the step S30.

The step S40 may be performed before the step S50 or may be performed after the step S50. The step S40 may include a process of polishing the inner surface 300 of the cover window 30 and may be performed by a computer numerical control (CNC) process. The inner surface 300 of the cover window 30 may include a bottom surface 301 and an inner side surface 303 extending from the bottom surface 301.

In the polishing process, the inner surface 300 of the cover window 30 may be fully polished using a polishing member. The inner surface 300 of the cover window 30 may be fully polished by moving the polishing member in a direction substantially parallel to the inner surface 300 while rotating the polishing member. Since the inner surface 300 of the cover window 30 is polished, the strength of the cover window 30 may be improved, and defects occurring at the inner surface 300 may be removed.

Referring to FIG. 9A, a connecting portion of the bottom surface 301 and the inner side surface 303 may be chamfered or filleted by step S40, and thus the connecting portion may have curvature.

The step S50 may include a process of polishing the outer surface 310 of the cover window 30 and may be performed by a computer numerical control (CNC) process. The outer surface 310 of the cover window 30 may include a top surface 311 and an outer side surface 313 extending from the top surface 311.

In the polishing process, the outer surface 310 of the cover window 30 may be fully polished using a polishing member. The outer surface 310 of the cover window 30 may be fully polished by moving the polishing member in a direction substantially parallel to the outer surface 310 while rotating the polishing member. Since the outer surface 310 of the cover window, 30 is polished, the strength of the cover window 30 may be improved, and defects occurring at the outer surface 310 may be removed.

Referring to FIG. 9B, a connecting portion of the top surface 311 and the outer side surface 313 may be chamfered or filleted by step S50, and thus the connecting portion may have curvature.

Since the inner surface 300 and the outer surface 310 of the cover window 30 are processed by the polishing processes, it is possible to minimize a heat-affected zone (HAZ) generated in a portion to which the first and second laser lights LZ1 and LZ2 are irradiated.

In the method for manufacturing the window according to the embodiments of the inventive concepts, the portion of the transparent member may be cut and removed by the first laser light and the second laser light, and thus the processing time may be reduced. As a result, process efficiency may be improved.

While the inventive concepts have been described with reference to example embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

What is claimed is:

1. A method for manufacturing a cover window, the method comprising:
    forming a groove by irradiating first laser light to an edge of a first area defined on a bottom surface of a transparent member, wherein the first laser light removes a first portion of the transparent member at the bottom surface; and
    forming a solid removable portion of the transparent member by irradiating second laser light, which is different from the first laser light and has a focus fixed at a depth of the groove of the transparent member, to the first area, wherein the second laser light passes through the transparent member at the bottom surface while removing a second portion of the transparent member at the depth of the groove, and wherein a first planar surface of the solid removable portion of the transparent member is formed by the first laser light and a second planar surface of the solid removable portion of the transparent member is formed by the second laser light; and
    removing the solid removable portion to form the cover window.

2. The method of claim 1, wherein the first laser light has an infrared wavelength.

3. The method of claim 1, wherein the second laser light has an ultraviolet wavelength.

4. The method of claim 1, further comprising:
    processing a top surface of the transparent member.

5. The method of claim 4, wherein the processing of the top surface of the transparent member comprises a computer numerical control (CNC) process.

6. The method of claim 4, wherein the processing of the top surface of the transparent member is performed before the forming of the groove by irradiating the first laser light.

7. The method of claim 4, wherein the processing of the top surface of the transparent member comprises a polishing process.

8. The method of claim 1, wherein the first laser light is emitted by a laser generator, and
    wherein the laser generator has a constant moving speed and irradiates the first laser light with a constant intensity to the edge of the first area of the transparent member.

9. The method of claim 1, wherein the first area has a square shape or a rectangular shape when viewed in a plan view.

10. The method of claim 1, wherein a spot size of the first laser light is greater than a spot size of the second laser light.

11. The method of claim 1, wherein a spot size of the first laser light ranges from 20 μm to 30 μm.

12. The method of claim 1, wherein a spot size of the second laser light ranges from 5 μm to 15 μm.

13. The method of claim 1, wherein the depth of the groove formed by the first laser light ranges from 0.3 mm to 0.7 mm.

14. The method of claim 1, wherein the second planar surface intersects the first planar surface at the depth of the groove and is parallel to one surface of the transparent member.

15. The method of claim 1, further comprising:
    processing an inner surface of the cover window; and
    processing an outer surface of the cover window.

16. The method of claim 15, wherein the processing of the inner surface of the cover window and the processing of the outer surface of the cover window are performed by computer numerical control (CNC) processes.

17. The method of claim 15, wherein each of the processing of the inner surface of the cover window and the processing of the outer surface of the cover window comprises a polishing process.

18. The method of claim 15, wherein the inner surface of the cover window includes: a bottom surface; and an inner side surface extending from the bottom surface,
    wherein the outer surface of the cover window includes: a top surface; and an outer side surface extending from the top surface, and wherein an angle between the bottom surface and the inner side surface of the cover window is about 90 degrees.

19. A method for manufacturing a display device, the method comprising:
preparing a display panel;
forming a groove by irradiating first laser light to an edge of a first area defined on a bottom surface of a transparent member, wherein the first laser light removes a first portion of the transparent member at the bottom surface;
forming a solid removable portion of the transparent member by irradiating second laser light, which is different from the first laser light and has a focus fixed at a depth of the groove of the transparent member, to the first area, wherein the second laser light passes through the transparent member at the bottom surface while removing a second portion of the transparent member at the depth of the groove, and wherein a first planar surface of the solid removable portion of the transparent member is formed by the first laser light and a second planar surface of the removed solid removable portion of the transparent member is formed by the second laser light;
removing the solid removable portion to form a cover window; and
bonding the display panel and the cover window to each other.

20. The method of claim 19, wherein the first laser light has an infrared wavelength, and
wherein the second laser light has an ultraviolet wavelength.

* * * * *